Jan. 31, 1939.  R. C. TUCKER  2,145,820

BYPASS VALVE

Filed June 19, 1936

Inventor
Robbie C. Tucker.

Patented Jan. 31, 1939

2,145,820

UNITED STATES PATENT OFFICE 2,145,820

BYPASS VALVE

Robbie C. Tucker, Conroe, Tex.

Application June 19, 1936, Serial No. 86,047

3 Claims. (Cl. 137—68)

This application relates to a valve for controlling the flow of oil or the like, into tanks or storage receptacles, and has particular reference to an arrangement whereby the oil will be permitted to flow into one tank until the level in said tank reaches a predetermined point, whereupon the flow will automatically be shifted to a second tank or receptacle.

It has heretofore been the practice to provide manually operated valves for the purpose of controlling the flow of oil into one of a plurality of tanks or receptacles so that when one receptacle is filled the flow can be turned into another. Attempts have also been made to provide automatic means for shifting the flow to accomplish this result. In such attempts, however, various difficulties have been encountered, such as for instance the creation of gas pockets which might possibly diminish or shut off the flow. It has also been experienced that the previously designed devices are adversely affected by weather conditions, and their efficiency has been impaired by corrosion of the various parts, etc. Furthermore, the prior art devices have required numerous connections with the roof or cover of the tank or receptacle, and have, therefore, involved considerable expense and special work in installation, and have increased the number of necessary connections with the tank or receptacle top when it is desirable to reduce the number of such connections in so far as possible.

It is an object of this invention to overcome the various difficulties and defects which have been encountered in the prior art, and to provide an automatic device which is sure in its operation and is not adversely affected by weather conditions.

It is a further object to provide a device which requires a minimum number of connections with the tank roof or top, and involves a minimum cost of installation. It is a further object to provide a device in which all working parts are fully protected from the elements.

It is a further object to provide a device in which the formation of gas pockets is impossible.

With the above and other objects in view, this invention contemplates the various parts and combinations illustrated in the accompanying drawing, it being understood, however, that the same is by way of example only, and is not to be taken as in any way a limitation upon the scope of this invention. Such limitation is to be only by the prior art and by the terms of the appended claims.

Referring now more particularly to the drawing in which like numerals indicate corresponding parts throughout:

Figures 1, 2:
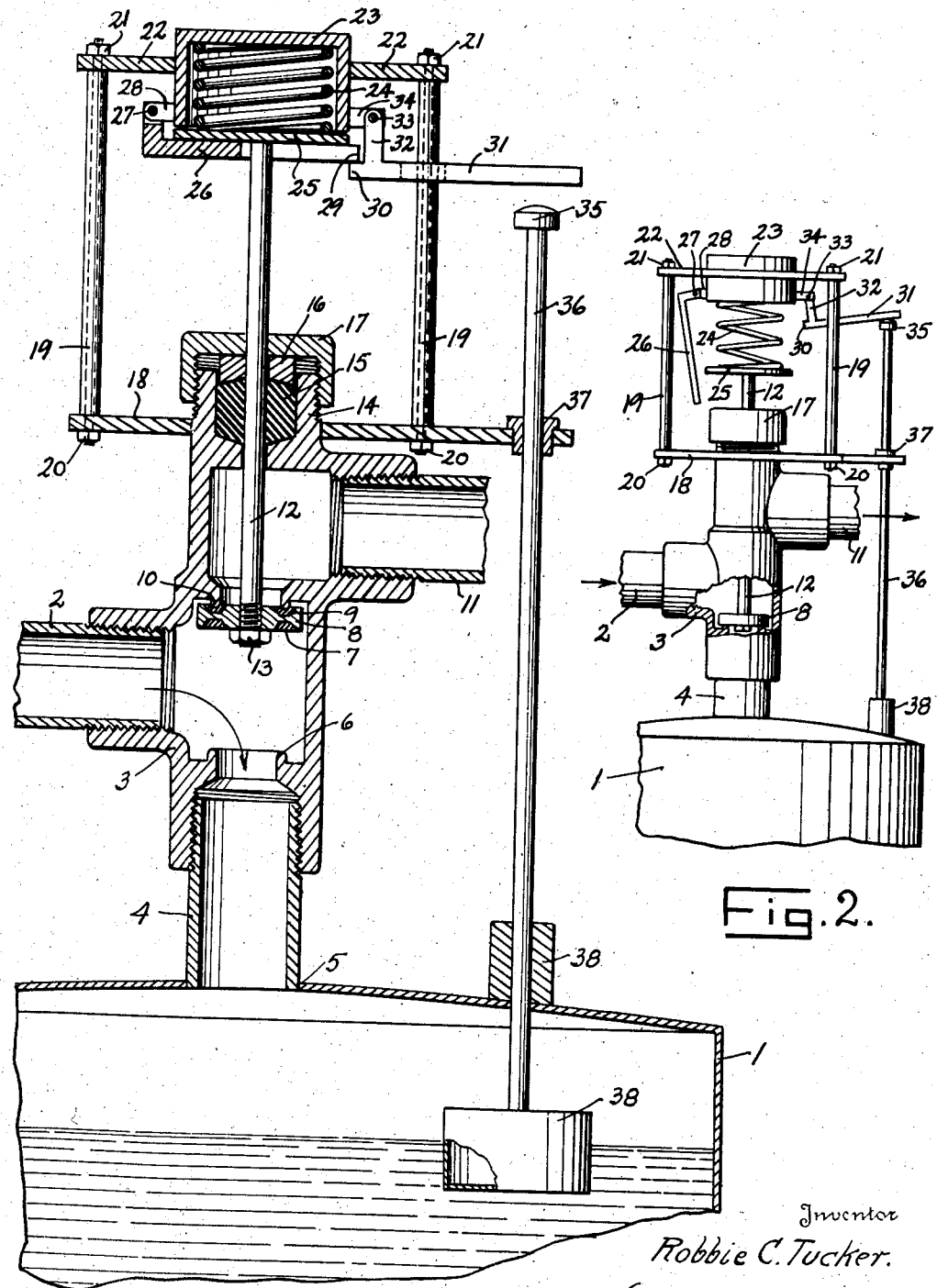
Fig. 1 is a vertical sectional view illustrating a device constructed in accordance with this invention.
Fig. 2 is a reduced elevation partly in section showing the device after the tank to which it is connected has been filled and the device is operated to divert the flow to another tank.

As illustrated in this drawing, the numeral 1 indicates a tank or other receptacle adapted to receive the oil or other liquid which is to be stored. This liquid is led into the tank 1 through an intake pipe 2, and passes from this pipe 2 through the valve housing 3 and the nipple 4 into the tank 1. The pipe 2 and the nipple 4 are connected to the valve housing 3 in any suitable manner, preferably by threads such as illustrated, and the nipple 4 is connected to the roof of the tank 1 at 5 by any means such as welding or the like.

Surrounding the outlet from the valve housing 3 into the nipple 4 is a valve seat 6 adapted to cooperate with the valve facing 7 on the lower face of the valve member 8 so that when the valve member 8 is in its lower position liquid will be prevented from flowing into the nipple 4 and the tank 1. On its upper face, the valve member 8 is provided with a second valve facing 9 adapted to cooperate with a valve seat 10 leading to an upper chamber within the valve housing. In Fig. 1 the valve is shown with the valve facing 9 in sealing engagement with the valve seat 10 so as to close the opening into the upper chamber. Communicating with the upper chamber of the valve housing is a second pipe 11 which leads to one or more other tanks or receptacles which are to be filled. This pipe 11 is threadedly or otherwise connected to the valve housing 3.

The valve member 8 is secured to the lower end of a valve stem 12 by means of a nut 13 or other suitable connection. This valve stem 12 extends upwardly through a packing box 14 formed above the upper chamber of the valve housing and is surrounded by a packing 15 within said box. The packing 15 is compressed in the usual manner by means of a gland 16 held in position by a nut 17.

Rigidly secured to the upper portion of the valve housing and extending laterally therefrom in a position adjacent the packing box 14 just referred to is a support 18 which receives the lower ends of a plurality of supporting bolts 19. These bolts are secured to the support 18 by means of nuts 20 or the like, and at their upper ends are secured by nuts 21 in a similar manner to a substantially horizontal supporting plate 22. This plate 22 surrounds and is rigidly connected to the inverted cup-shaped housing 23 within which is received a compression spring 24. The compression spring 24 bears against the upper surface of a plate 25 which is in turn carried by the upper end of the valve stem 12. The plate 25 is normally held upwardly and the spring 24 is maintained in compressed position by means of a lever 26 pivoted at 27 to an ear 28 on one side of the cup-shaped housing 23. This lever is bifurcated to straddle the valve stem 12 and extend to the opposite edge of the plate 25. At its opposite end 29 it is normally supported by the latch 30 carried by the lever 31. This lever 31 is provided with an upward extension 32 pivoted at 33 to a second ear 34 mounted on the outer face of the cup-shaped housing 23. It will be appreciated that by the means just described the valve 8 is normally maintained with its facing 9 in seated engagement with the valve seat 10 so as to prevent the flow of oil from the pipe 2 into the pipe 11 and permit the flow of oil from the pipe 2 into the nipple 4 and the tank 1.

The lever 31 extends laterally away from the valve stem 12, and is adapted to be contacted by a head 35 on the upper end of a rod 36. This rod 36 is slidably carried by a bushing 37 mounted in a laterally extending portion of the support 18 and by a guide 38 carried by the top of the tank or other receptacle. This rod passes through an opening in the tank top and on its lower end is connected with a float 38 which may be of any suitable construction.

In operation, the mechanism is first set in the position illustrated in Fig. 1 so that oil or other liquid is permitted to flow from the intake pipe 2 through the valve housing, past the valve seat 6, through the nipple 4, and into the tank 1. When the level in the tank 1 reaches a predetermined point, however, the float 38 connected to the rod 36 will rise and cause the head 35 on this rod to raise the outer end of the level 31. When this takes place, the latch 30 mounted on this lever will swing out from under the end 29 of the lever 26 and will release this lever so as to allow it to be swung downwardly by the force stored up in the spring 24. The spring 24 will thereupon cause the downward movement of the plate 25 and the valve stem 12 until the valve 8 is caused to move to its lower position, whereupon the valve facing 7 will seat against the valve seat 6 and close off communication between the intake pipe 2 and the nipple 4. Oil or other liquid will thereupon be prevented from flowing into the tank 1, and the tank will not be allowed to overflow. At the same time, the aforesaid movement of the valve 8 will cause it to leave the valve seat 10 and to open communication between the intake pipe 2 and the pipe 11, thus by-passing the liquid and conducting it to another storage reservoir. In its second position, the mechanism is illustrated in Fig. 2 in which it will be seen that the valve 8 is in contact with its lower seat and the path taken by the liquid is indicated by the arrows. The expanded position of the spring 24 is illustrated in the upper portion of Fig. 2, together with the released position of the levers 31 and 26.

It is noted that the only moving portions of this device which are exposed to the weather in any way are the fulcrums of the levers 26 and 31, and that these are protected by the laterally extending support plate 22. It is noteworthy that the cup-shaped housing 23 normally forms a substantially complete enclosure when taken with the plate 25, which inclosure fully protects the spring 24 from the corrosive effects of the elements.

It is further noteworthy that the construction of the valve housing 3 is such that no gas pockets are formed in either position of the valve 8 which could in any way obstruct the flow of liquid through the valve.

Furthermore, provision is made for obtaining a full opening for flow of the liquid regardless of the position of the valve.

It will be apparent from the foregoing that means have been provided for carrying out all the objects and advantages sought by this invention.

Having described my invention, I claim:

1. The combination with a support, of a bypass valve mounted thereon and having a body and a vertically disposed reciprocable stem, a cover plate supported on said body above the same, a spring bearing upon said stem, trigger mechanism controlling said stem, a housing carried by said plate and enclosing said spring, said plate extending laterally of said housing, said trigger mechanism comprising a member pivotally mounted on the outside of said housing, the pivot of said member lying closely beneath said cover plate and thus protected from the weather.

2. The combination with a support, of a bypass valve mounted thereon and having a vertically disposed reciprocable stem, a pair of horizontal plates, means rigidly connecting said plates to hold them in spaced parallel relation, the lowermost of said plates fitting over and supported on said valve, a spring bearing upon said stem, a housing carried by the uppermost of said plates and enclosing said spring, and trigger mechanism controlling said stem and comprising a pair of interengaging members pivotally mounted on said housing, between said plates, the pivots of said members lying closely beneath the uppermost of said plates, and thus protected from the weather.

3. The combination with a support, of an elongated valve body mounted at its lower end on said support and having a pair of branch sockets extending laterally therefrom, a valve seat in said body between said sockets, and an oppositely facing valve seat between one of said sockets and the lower end of said valve body, a reciprocable valve adapted to selectively engage either of said seats and movable from one to the other, said valve comprising a stem extending axially of said body and projecting from the upper end thereof, a cover plate supported above said valve body, a spring and trigger mechanism controlling said valve, a housing supported by said cover plate and enclosing said spring, said spring bearing upon the upper end of said valve stem and tending to move said valve downwardly out of engagement with the first mentioned seat and into engagement with the second, and said trigger mechanism comprising a member pivotally mounted on said housing closely beneath said cover plate to releasably restrain the downward movement of said valve.

ROBBIE C. TUCKER.